United States Patent Office 2,865,572
Patented Dec. 23, 1958

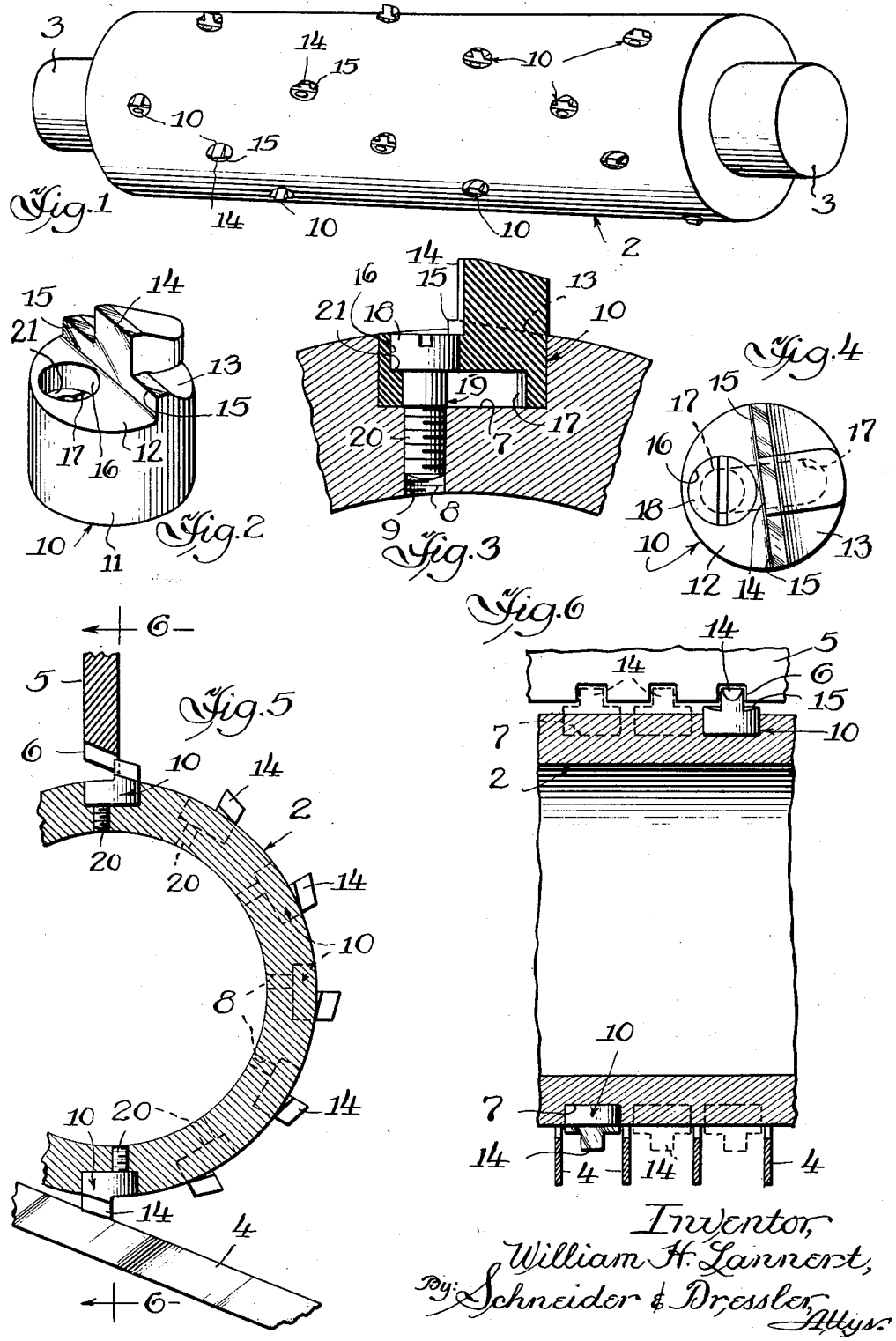
Dec. 23, 1958 — W. H. LANNERT — 2,865,572
COMMINUTING CYLINDER WITH INDIVIDUAL MOUNTED CUTTING AND SHEARING TEETH
Filed March 29, 1954
Inventor,
William H. Lannert,
By: Schneider & Dressler, Attys.

2,865,572

COMMINUTING CYLINDER WITH INDIVIDUAL MOUNTED CUTTING AND SHEARING TEETH

William H. Lannert, Skokie, Ill., assignor to Chicago Pump Company, a corporation of Delaware Application March 29, 1954, Serial No. 419,277

2 Claims. (Cl. 241—294)

This invention relates to a cutting and shearing tooth, and is particularly concerned with a tooth which may be mounted on a unit of a comminuting device to co-operate with a comb or screen to simultaneously cut and shear solids intercepted by a screen from a stream of sewage.

The cutting and shearing tooth of the present invention may be used on cylindrical bar screens of the type shown in the patents to Nordell, No. 2,085,326, issued June 29, 1937, and Chase, No. 2,322,922, issued June 29, 1943. In the drawings the tooth is shown as mounted on the peripheral surface of a cutting cylinder, interposed between a screen extending across a channel through which a stream of sewage flows and a comb. The screen and comb are preferably arranged to engage diametrically opposed peripheral surfaces of the cylinder but may be spaced closer together. Liquid sewage flowing through the channel passes through the screen, and solids in the sewage that are too large to pass through the screen are intercepted thereby. The cylinder, which is rotated by any suitable means, is provided with a plurality of laterally projecting cutting and shearing teeth which pass between adjacent screen elements to transfer solids intercepted by the screen from the screen to the comb. The comb is notched to cooperate with portions of the teeth which pass through the notches to cut small bites out of solids which are engaged between the notches of the comb and the portions of the teeth passing through the notches. Each tooth is provided with edges adjoining the cutting portion which pass the portions of the comb between the notches with very small clearance and co-operate with the comb to shear the solids engaged therebetween. The provision of shearing edges on the cutting teeth simplifies the construction of the cutting cylinder by eliminating the necessity of providing separate shear bars on the cylinder.

In accordance with the present invention the teeth are individually mounted in recesses provided therefor in the peripheral surface of the cylinder and each tooth is arranged with its cutting and shearing edge at a slight angle to the longitudinal axis of the cylinder to improve the shearing action of the teeth. The angular arrangement of the teeth also minimizes the strain on the teeth as they exert cutting or shearing force against the solids engaged by them. The teeth are also staggered with reference to their radial position relative to the cylinder, so that the teeth pass the comb singly. If a group of several teeth pass the comb simultaneously, the shock to which the cylinder is subjected is much greater than when a single tooth passes it.

The structure by which the above mentioned and other advantages of the invention are attained will be described in the following specification, taken in conjunction with the accompanying drawings showing a preferred illustrative embodiment, in which:

Fig. 1 is a perspective view of a cutting cylinder provided with cutting and shearing teeth in accordance with the invention;

Fig. 2 is a detail perspective view of one of the cutting and shearing teeth embodying the invention;

Fig. 3 is a fragmentary cross sectional view through the cylinder and one of the teeth to show the means for securing the teeth to the cylinder;

Fig. 4 is a top plan view of one of the teeth secured to the cylinder showing the angularity of the cutting and shearing edge of the tooth;

Fig. 5 is a fragmentary cross sectional view showing the cylinder and the relationship of the teeth to the screen adjacent one side of the cylinder and the comb adjacent the diametrically opposed side of the cylinder; and Fig. 6 is a fragmentary cross sectional view, taken along the line 6—6 of Fig. 5.

Referring to the drawings, the numeral 2 indicates a cutting cylinder mounted on a shaft 3 journalled in suitable bearings (not shown) to rotate the cylinder. In use, the cutting cylinder is positioned between a plurality of screen elements 4 and a comb 5. The cylinder, screen elements, and comb are mounted in a channel (not shown) through which a stream of liquid sewage containing solids flows. The screen elements are spaced in parallel relationship closely enough to intercept all the solids except those of very small size which may pass between the screen elements. The comb comprises a strip extending parallel to the longitudinal axis of the cylinder and is provided with a plurality of notches 6 spaced longitudinally on its edge adjacent the periphery of the cylinder for a purpose hereinafter disclosed.

Cutting cylinder 2 is provided with a plurality of recesses 7 extending inwardly from its peripheral surface. These recesses, which are of uniform size, are preferably cylindrical, but may be of any desired shape. Each recess is aligned transversely with the space between two adjacent screen elements 4 and with one of the notches 6. Recesses 7 are staggered radially relative to the periphery of cylinder 2 for a purpose hereinafter described. A bore 8 extends from the bottom of each recess 7 entirely through the cutting cylinder and is threaded, as indicated at 9. A cutting and shearing tooth 10, having a base portion 11 of substantially the same size as the recesses 7 is drive fitted into each recess 7.

When the tooth 10 is driven into recess 7 one portion 12 of its upper face is substantially flush with the peripheral surface of the cutting cylinder. The other portion 13 of the upper face of tooth 10 projects upwardly at right angles to the face 12 to form a cutting edge 14 and a pair of shearing edges 15 extending on opposite sides of cutting edge 14. Edges 14 and 15 are aligned in the same vertical plane, but edge 14 projects above edges 15 a distance substantially equal to the depth of notches 6. The projecting portion 13 of the tooth is cut back from the front edge defining the cutting and shearing edges at suitable angles to provide cutting clearance. Tooth 10 is preferably formed of hardened steel, but may be formed of ordinary steel and the cutting and shearing portions formed of a separate plate of hardened steel and secured to the projecting portion 13 by welding or riveting.

Base 11 of each tooth 10 is provided with a recess 16 extending downwardly from its face portion 12 and with a recess 17 extending upwardly from its bottom. Recess 16 is circular and of suitable size to receive the head 18 of a bolt 19. Shank 20 of bolt 19 is threaded to engage thread 9 of bore 8. Recess 17 is elongated to extend under portion 13 of the tooth, and one end is offset from the edge of recess 16 to provide a shoulder 21 adapted to be engaged by the underside of head 18 when bolt 19 is threaded into bore 8.

Each tooth 10 is driven into recess 7 with the plane of its cutting and shearing edges 14 and 15 at a slight angle to the longitudinal axis of cutting cylinder 2, and is then secured in place by a bolt 19. As shown in the lower portion of Fig. 6, the diameter of the tooth is substantially equal to the distance between adjacent screen elements 4. As each tooth 10 passes between screen elements 4 the projecting portion 13 of each tooth engages solids intercepted by the screen elements and carries them around to comb 5. Cutting edge 14 passes through notch 6, with which it is transversely aligned, and cooperates with the edges of comb 5 contiguous to the notch to comminute the solids aligned with the notch. Simultaneously shearing edges 15 pass adjacent adjoining edge portions of comb 5 with very little clearance, and shear the solids engaged between edges 15 and the lower edge of the comb. The angularity of the shearing edges 15 relative to the edge of comb 5 insures a progressive engagement of edge 15 with the solids to induce a true shearing action with a minimum of shock to the tooth and comb. The radially staggered relationship of recesses 7 insures that each tooth 10 will pass comb 5 individually so that the comb and cylinder are subjected to only slight shock caused by engagement of only a small amount of solids between one tooth 10 and comb 5 instead of the combined shock that would result if a large group of teeth, each with an accumulation of solids, passed the comb simultaneously.

The nature of the environment in which the teeth operate, and the fact that they are originally drive fitted into recesses 7, makes it obvious that each tooth is firmly secured in its recess so that it can not be easily removed. The undercut portion of recess 17 provides space into which a hooked implement can be inserted after bolt 19 is removed. Any tooth may be removed simply by inserting the hooked end of a suitable implement through recess 16 into the undercut portion of recess 17 and pulling the tooth upwardly.

Although I have described a preferred embodiment of my invention in considerable detail, it will be understood that the description thereof is intended to be illustrative, rather than restrictive, as many details may be modified or changed without departing from the spirit or scope of the invention. Accordingly, I do not desire to be restricted to the exact details of construction described.

I claim:

1. A cutting and shearing tooth comprising a base, cutting and shearing edges projecting upwardly from one portion of the upper face of said base, the other portion of the upper face of said base having a recess therein for receiving a fastening member by which said tooth may be secured to a suitable support, and a second recess communicating with said first recess and extending under said first mentioned portion of the upper-face of said base to facilitate removal of said tooth from said support, said cutting edge being disposed in a horizontal plane spaced from the horizontal plane of said shearing edges.

2. In combination with a cylinder having a cylindrical recess in its peripheral surface, a tooth secured in said recess, said tooth having a base portion with its upper face flush with the peripheral surface of said cylinder, a cutting edge projecting upwardly from said base portion beyond the peripheral surface of said cylinder, a pair of shearing edges projecting upwardly from said base portion on opposite sides of said cutting edge to a height less than the height of said cutting edge, said cutting and shearing edges being aligned in a vertical plane extending angularly relative to the longitudinal axis of said cylinder.

References Cited in the file of this patent

UNITED STATES PATENTS

| | | |
|---|---|---|
| 994,264 | MacKay | June 6, 1911 |
| 1,396,108 | Gilmore | Nov. 8, 1921 |
| 2,278,274 | Lind | Mar. 31, 1942 |
| 2,429,157 | Fowler | Oct. 14, 1947 |